(12) United States Patent
Jiang

(10) Patent No.: US 12,108,259 B2
(45) Date of Patent: Oct. 1, 2024

(54) INFORMATION TRANSMISSION METHOD IN UNLICENSED BAND, TERMINAL, AND NETWORK DEVICE

(71) Applicant: VIVO MOBILE COMMUNICATION CO., LTD., Dongguan (CN)

(72) Inventor: Lei Jiang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 522 days.

(21) Appl. No.: 17/349,894

(22) Filed: Jun. 16, 2021

(65) Prior Publication Data
US 2021/0314779 A1 Oct. 7, 2021

Related U.S. Application Data

(63) Continuation of application No. PCT/CN2019/121193, filed on Nov. 27, 2019.

(30) Foreign Application Priority Data

Dec. 21, 2018 (CN) .......................... 201811570008.6

(51) Int. Cl.
*H04W 16/14* (2009.01)
*H04W 56/00* (2009.01)
*H04W 72/04* (2023.01)

(52) U.S. Cl.
CPC ....... *H04W 16/14* (2013.01); *H04W 56/0045* (2013.01); *H04W 72/04* (2013.01)

(58) Field of Classification Search
CPC . H04W 16/14; H04W 56/0045; H04W 72/04; H04W 72/0446; H04W 72/23; H04L 5/0053

USPC .......................................................... 370/329
See application file for complete search history.

(56) References Cited

U.S. PATENT DOCUMENTS

| 2017/0303246 | A1* | 10/2017 | Wang | ................... | H04W 72/23 |
| 2017/0359808 | A1 | 12/2017 | Dinan | | |
| 2018/0249497 | A1 | 8/2018 | Noh et al. | | |
| 2021/0282147 | A1* | 9/2021 | Xu | ......................... | H04W 72/23 |
| 2021/0345407 | A1* | 11/2021 | Myung | .................. | H04L 5/0094 |

(Continued)

FOREIGN PATENT DOCUMENTS

| CN | 105323049 A | 2/2016 |
| CN | 105991211 A | 10/2016 |
| CN | 107079333 A | 8/2017 |

(Continued)

OTHER PUBLICATIONS

International Search Report issued in corresponding International Application No. PCT/CN2019/121193, mailed Mar. 6, 2020, 4 pages.

(Continued)

*Primary Examiner* — Rownak Islam
(74) *Attorney, Agent, or Firm* — IPX PLLC

(57) ABSTRACT

The embodiments of the present disclosure provide an information transmission method in an unlicensed band, a terminal, and a network device. The method includes receiving indication information; and performing transmission from an actual start location according to the indication information. The actual start location is a start location of a reference time domain symbol, or the actual start location is within the reference time domain symbol.

20 Claims, 6 Drawing Sheets

(56) References Cited

U.S. PATENT DOCUMENTS

2022/0014314 A1* 1/2022 Wang ................ H04W 72/1268

FOREIGN PATENT DOCUMENTS

| CN | 109413744 B | * | 12/2020 | ........... H04L 5/0053 |
| WO | WO-2016072778 A1 | * | 5/2016 | .............. H04J 11/00 |
| WO | 2017135726 A1 | | 8/2017 | |

OTHER PUBLICATIONS

Huawei et al., "Discussion on usage of mini-slot in unlicensed band below 6GHz", 3GPP TSG RAN WG1 NR AdHoc Meeting R1-1700420, Jan. 20, 2017.
Second Office Action issued in related Chinese Application No. 201811570008.6, mailed Aug. 2, 2023, 8 pages.
LG Electronics, "LBT operation for LAA DL", 3GPP TSG RAN WG1 meeting #80bis, R1-151514, Apr. 2015, 10 pages.
LG Electronics, "LBT operation for LAA", 3GPP TSG RAN WG1 Ad-hoc Meeting, R1-151080, Mar. 2015, 11 pages.

* cited by examiner

Send indication information, where the indication information is used to indicate an actual start location for transmission, and the actual start location is a start location of a reference time domain symbol, or the actual start location is within the reference time domain symbol. — 81

INFORMATION TRANSMISSION METHOD IN UNLICENSED BAND, TERMINAL, AND NETWORK DEVICE

CROSS-REFERENCE OF RELATED APPLICATIONS

This application is a bypass continuation of PCT Application No. PCT/CN2019/121193 filed on Nov. 27, 2019, which claims priority to Chinese Patent Application No. 201811570008.6 filed in China on Dec. 21, 2018, both of which are incorporated herein by reference in their entireties.

TECHNICAL FIELD

The present disclosure relates to the field of communications technologies, and in particular, to an information transmission method in an unlicensed band, a terminal, and a network device.

BACKGROUND

In a mobile communication system, an unlicensed band may serve as supplement of a licensed band, to help an operator perform service capacity expansion. To keep consistent with the deployment of New Radio (NR) and maximize unlicensed access based on NR as much as possible, an unlicensed band may work in bands of 5 GHz, 37 GHz, and 60 GHz. A high bandwidth (80 MHz or 100 MHz) of the unlicensed band can reduce implementation complexity of a network device and a terminal. The unlicensed band is shared by multiple Radio Access Technologies (RATs), for example, wireless-fidelity) (Wi-Fi), radar, and Long Term Evolution-Licensed Assisted Access (LTE-LAA). Therefore, the unlicensed band must comply with preset regulations during usage to ensure that all devices can fairly use the resource. The preset regulations include: Listen Before Talk (LBT), Maximum Channel Occupancy Time (MCOT), and other regulations. When a transmission node needs to send information and needs to perform LBT first, the transmission node performs Energy Detection (ED) on a surrounding node. When detected power is lower than a threshold, it is considered that a channel is idle and the transmission node can send the information. Otherwise, it is considered that the channel is busy and the transmission node cannot send the information. The transmission node mentioned herein can be a network device (such as a base station), a terminal, a WiFi Access Point (AP), and so on. After the transmission node starts to transmit the information, a Channel Occupancy Time (COT) cannot exceed a MCOT.

Common LBT or channel access categories (Cat) can be divided into Cat 1, Cat 2, and Cat 4. LBT or channel access mechanism of Cat 1 is that the transmission node performs no LBT, that is, no LBT or immediate transmission. LBT of Cat 2 is one-shot LBT. That is, the node performs LBT once before transmission, if a channel is empty, the node performs transmission, and if the channel is busy, the node performs no transmission. LBT of Cat 4 is a channel listening mechanism based on back-off. When a transmission node detects that a channel is busy, the transmission node performs back-off and continues listening until it is detected that a channel is empty. For a network device, LBT of Cat 2 is applied to a Discovery Signal (DS) without a Physical Downlink Shared Channel (PDSCH), and LBT of Cat 4 is applied to a PDSCH/Physical Downlink Control Channel (PDCCH)/enhanced PDCCH (ePDCCH). For a terminal, LBT of Cat 4 corresponds to UL channel access procedure of type 1 (type 1), and LBT of Cat 2 corresponds to UL channel access procedure of type 2 (type 2).

For example, in an unlicensed band, within a channel occupancy time (initiated COT) initiated by a network device, that is, a COT obtained by the network device through LBT, when a gap between the end of downlink transmission and the beginning of uplink transmission is less than 16 us, the terminal can perform LBT of Category 1; when a gap between two consecutive transmissions of the terminal in the COT is less than 25 us or when there is no downlink transmission (DL transmission) after uplink transmission (UL transmission), the terminal can perform LBT of Cat 2. The two consecutive transmissions of the terminal can be scheduled or granted. In addition, in the COT initiated by the network device, if a downlink burst follows an uplink burst and a gap between the end of scheduled uplink transmission and the beginning of the uplink burst is less than 16 us, LBT of Cat 1 can be used, and if the gap is greater than 16 us but is less than 25 us, LBT of Cat 2 can be used.

In enhanced Licensed Assisted Access (eLAA), the network device uses 1 bit in Downlink Control Information (DCI) to indicate a Channel Access type, that is, UL channel access procedure of type 1 or type 2. In NR, the network device uses a Time domain resource assignment field in the DCI to indicate a start location and duration of scheduling. An end location of transmission depends on the start location and the duration.

In an unlicensed band, a time domain granularity of LBT is microsecond us. For example, the gap is 16 us at most, so that LBT of Cat 1 can be used. A scheduling granularity of the network device is 1 time domain symbol (OFDM symbol, hereafter referred to as "OS"), and a minimum granularity of all signals is 1 OS. Therefore, solutions in related art cannot match the granularity of LBT. For example, when LBT is Cat 2, the terminal performs one-shot LBT and then starts transmission. For subcarrier spacings of 15 kHz and 30 kHz, duration of one OS is greater than 25 us. For other subcarrier spacings, the situation is similar and corresponds to 20S>25 us, or multiple OSs. Because the size of the OS is not a multiple of 25 us or 16 us, it cannot be ensured that a gap between two transmissions/an end time of LBT is the same as a start location of next transmission.

SUMMARY

Embodiments of the present disclosure provide an information transmission method in an unlicensed band, a terminal, and a network device, to solve the problem that the size of a time domain symbol in an unlicensed band does not match a granularity of gap/LBT.

According to a first aspect, an embodiment of the present disclosure provides an information transmission method in an unlicensed band, applied to a terminal side, and including:
  receiving indication information; and
  performing transmission from an actual start location according to the indication information, where the actual start location is a start location of a reference time domain symbol, or the actual start location is within the reference time domain symbol.

According to a second aspect, an embodiment of the present disclosure further provides a terminal, including:
  a first receiving module, configured to receive indication information; and a transmission module, configured to perform transmission from an actual start location according to the indication information, where the actual start location is a start location of a reference time domain symbol, or the actual start location is within the reference time domain symbol.

According to a third aspect, an embodiment of the present disclosure provides a terminal, including: a processor, a memory, and a computer program stored in the memory and executable on the processor. When the computer program is executed by the processor, the steps of the information transmission method in an unlicensed band are performed.

According to a fourth aspect, an embodiment of the present disclosure provides an information transmission method in an unlicensed band, applied to a network device side, and including:

sending indication information, where the indication information is used to indicate an actual start location for transmission, and the actual start location is a start location of a reference time domain symbol, or the actual start location is within the reference time domain symbol.

According to a fifth aspect, an embodiment of the present disclosure provides a network device, including:

a first sending module, configured to send indication information, where the indication information is used to indicate an actual start location for transmission, and the actual start location is a start location of a reference time domain symbol, or the actual start location is within the reference time domain symbol.

According to a sixth aspect, an embodiment of the present disclosure further provides a network device, including: a processor, a memory, and a computer program stored in the memory and executable on the processor. When the computer program is executed by the processor, the steps of the information transmission method in an unlicensed band are performed.

According to a seventh aspect, an embodiment of the present disclosure provides a computer-readable storage medium, where the computer-readable storage medium stores a computer program. When the computer program is executed by a processor, the steps of the information transmission method in an unlicensed band are implemented.

In this way, in the embodiments of the present disclosure, the start location of uplink transmission of the terminal can be the start location of a time domain symbol, or can be within a time domain symbol. A start location of transmission is more flexible. This can resolve the problem of granularity matching between information scheduling and unlicensed band transmission, and further ensure normal uplink transmission in an unlicensed band.

BRIEF DESCRIPTION OF DRAWINGS

To describe the technical solutions in embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive another drawing from these accompanying drawings without creative efforts.

DETAILED DESCRIPTION

Figure 1:
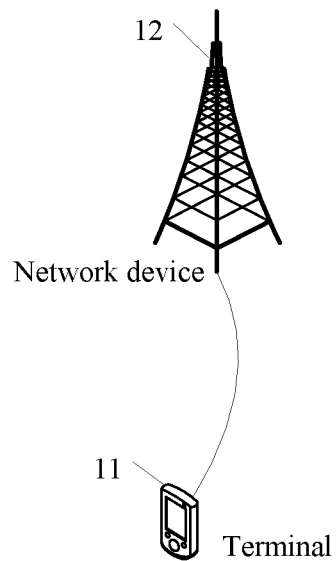
FIG. 1 is a block diagram of a mobile communications system to which an embodiment of the present disclosure can be applied.

Exemplary embodiments of this disclosure will be described below in further detail with reference to the accompanying drawings. Although the accompanying drawings show exemplary embodiments of the present disclosure, it should be understood that the present disclosure can be implemented in various forms and shall not be limited by embodiments described herein. On the contrary, these embodiments are provided to enable a more thorough understanding of the present disclosure and to fully convey the scope of the present disclosure to those skilled in the art.

Terms "first,", "second", or the like in the description and claims of this application are used to distinguish similar objects, instead of describing a specific sequence or order. It should be understood that the data termed in such a way is interchangeable in proper circumstances so that the embodiments of this application described herein can be implemented in an order other than the order illustrated or described herein. Moreover, the terms "include", "contain" and any variants thereof mean to cover the non-exclusive inclusion, for example, a process, method, system, product, or device that includes a list of steps or units is not necessarily limited to those expressly listed steps or units, but may include other steps or units not expressly listed or inherent to such a process, method, product, or device. "And/or" used in the specification and claims means at least one of the connected objects.

The technology described in this specification is not limited to a Long Term Evolution) LTE)/LTE-Advanced (LTE-A) system, and may also be used in various wireless communications systems such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and another system. The terms "system" and "network" are usually used interchangeably. The technology described herein can be used in the above-mentioned systems and radio technologies as well as other systems and radio technologies. However, an NR system is described in the following description for illustrative purposes, and an NR terminology is used in most of the following description, although these technologies can also be applied to applications other than the NR system application.

The following description provides examples and does not limit the scope, applicability, or configuration set forth in the claims. The functions and arrangements of the elements under discussion may be changed without departing from the spirit and scope of the present disclosure. In various examples, various procedures or components may be ignored, replaced, or added appropriately. For example, the described method may be performed in an order different from that described, and steps may be added, ignored, or combined. In addition, features described with reference to some examples may be combined in other examples.

Referring to FIG. 1, FIG. 1 is a block diagram of a wireless communications system to which an embodiment of the present disclosure can be applied. The wireless communications system includes a terminal 11 and a network device 12. The terminal 11 may also be referred to as a terminal device or User Equipment (UE). The terminal 11 may be a terminal side device such as a mobile phone, a Tablet Personal Computer, a Laptop Computer, a Personal Digital Assistant (PDA), a Mobile Internet Device (MID), a Wearable Device, or an in-vehicle device. It should be noted that a specific type of the terminal 11 is not limited in some embodiments of the present disclosure. The network device 12 may be a base station or a core network. The base station may be a base station of 5G or a later version (for example, gNB or 5G NR NB), or a base station in another communications system (for example, an eNB, a wireless local area network (WLAN) access point, or another access point). The base station may be referred to as a NodeB, an evolved NodeB, an access point, a Base Transceiver Station (BTS), a radio base station, a radio transceiver, a Basic Service Set (BSS), an Extended Service Set (ESS), aNodeB, an evolved NodeB (eNB), a home NodeB, a home evolved NodeB, a WLAN access point, a Wi-Fi node, or another appropriate term in the art. As long as a same technical effect is achieved, the base station is not limited to a specified technical term. It should be noted that, in embodiments of the present disclosure, only a base station in an NR system is used as an example, but a specific type of the base station is not limited.

The base station can communicate with the terminal 11 under the control of a base station controller. In various examples, the base station controller may be a part of the core network or some base stations. Some base stations can exchange control information or user data with the core network through backhaul. In some examples, some of these base stations may communicate directly or indirectly with each other through a backhaul link, and the backhaul link may be a wired or wireless communication link. The wireless communications system can support operations on multiple carriers (waveform signals of different frequencies). A multi-carrier transmitter can simultaneously transmit modulated signals on these multiple carriers. For example, each communication link may be a multi-carrier signal modulated based on various radio technologies. Each modulated signal can be sent over different carriers and can carry control information (for example, a reference signal or a control channel), overhead information, data, and the like.

The base station can wirelessly communicate with the terminal 11 via one or more access point antennas. Each base station may provide communication coverage for a corresponding coverage area. A coverage area of an access point may be divided into sectors that form merely a part of the coverage area. The wireless communications system may include different types of base stations (for example, a macro base station, a micro base station, or a pico base station). The base station can also use different radio technologies, such as cellular or WLAN radio access technologies. The base station can be associated with the same or different access networks or operator deployment. Coverage areas of different base stations (including coverage areas of base stations of the same or different types, coverage areas using the same or different radio technologies, or coverage areas belonging to the same or different access networks) may overlap.

The communication link in the wireless communications system may include an uplink for carrying Uplink (UL) transmission (for example, from the terminal 11 to the network device 12), or a downlink for carrying Downlink (DL) transmission (for example, from the network device 12 to the terminal 11). The UL transmission may also be referred to as reverse link transmission, and the DL transmission may also be referred to as forward link transmission. The downlink transmission may be performed in a licensed band, an unlicensed band, or both. Similarly, the uplink transmission may be performed in a licensed band, an unlicensed band, or both.

Figure 2:
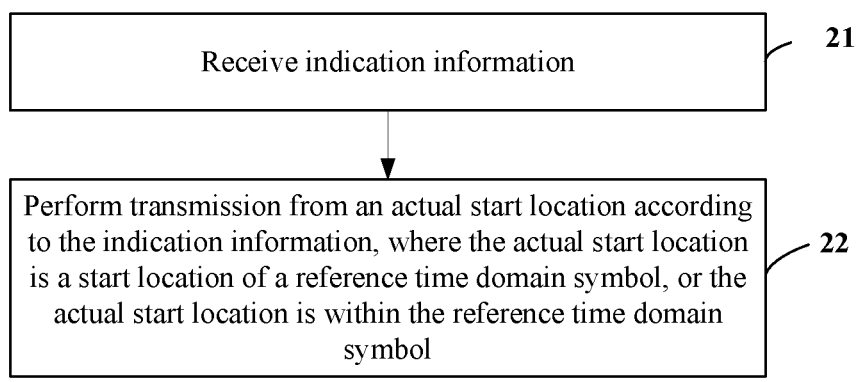
FIG. 2 is a schematic flowchart of an information transmission method in an unlicensed band for a terminal according to an embodiment of the present disclosure.

An embodiment of the present disclosure provides an information transmission method in an unlicensed band, applied to a terminal. As shown in FIG. 2, the method includes the following steps:

Step 21: Receive indication information.

The indication information is used to indicate an actual start location of transmission, and the indication information can directly indicate the actual start location of transmission via one indicator field, or indirectly indicate the actual start location of transmission via multiple indicator fields. For example, a channel access type (or called an LBT category) and whether the actual start location is on the boundary of a time domain symbol (such as an OFDM symbol, OS for short) are indicated, to jointly indicate the actual start location of transmission.

The indication information may be carried in Downlink Control Information (DCI), or the indication information may also be carried in Radio Resource Control (RRC) signaling.

Step 22: Perform transmission from an actual start location according to the indication information, where the actual start location is a start location of a reference time domain symbol, or the actual start location is within the reference time domain symbol.

The actual start location mentioned herein refers to an actual start location of transmission or transmission burst. The above transmission is UL transmission of the terminal. Transmission before this transmission can be UL transmission, or DL transmission burst of the network device. A gap between two transmissions can be used for receive/transmit (Rx/Tx) conversion, or Rx/Tx conversion and LBT. The determination of the actual start location of transmission can also be determination of a start location of the latter transmission of two uplink transmissions. In the embodiments of the present disclosure, the reference time domain symbol can refer to any time domain symbol. That is, the actual start location for transmission can be a start location (or called the boundary or the start boundary) of a time domain symbol, or can be within a time domain symbol. "Within" herein refers to locations other than the start location. In this way, a start location of transmission is more flexible. This can resolve the problem of granularity matching between transmission scheduling and unlicensed band transmission, and ensure normal uplink transmission in an unlicensed band.

The following embodiments of the present disclosure further illustrate the indication information and how the terminal obtains the actual start location of transmission with reference to the accompanying drawings. For example, the indication information performs indication through multiple indicator fields, and indication manners of the indication information include but are not limited to:

Manner 1: the indication information includes a first indicator field used to indicate a channel access type; and a second indicator field used to indicate whether the actual start location is a start location of time domain resource assignment.

The channel access type includes, but is not limited to: category 1, category 2, and category 4 of LBT. If the terminal uses category 1 of LBT, the terminal does not need to perform LBT. If the terminal uses category 2 of LBT, the terminal needs to perform LBT once before transmission. If the terminal uses category 4 of LBT, the terminal needs to continue to perform LBT before transmission until it is detected that a channel is empty. A granularity of time domain resource assignment (for example, a resource scheduled in a "time domain resource assignment" field in the DCI) in the embodiments of the present disclosure is a time domain symbol. When the gap between two transmissions is less than 16 us, category 1 of LBT can be used. When the gap between two transmissions is less than 25 us, category 2 of LBT can be used. That is, if the terminal uses category 1 of LBT, the gap between two transmissions should be less than 16 us; and if the terminal uses category 2 of LBT, the LBT time needs to be 25 us. Different Sub-Carrier Spacings (SCSs) correspond to different time lengths of time domain symbols, and there may be a problem that a granularity of time domain resource assignment does not match a granularity of gap/LBT. To avoid this problem, the network device of the embodiments of the present disclosure can use the indication information to indicate that the actual start location of the transmission is on the boundary of or within a time domain symbol, to perform granular matching.

The terminal can obtain the used channel access type according to the first indicator field. As mentioned above, different channel access types correspond to different gap or LBT times, that is, the first indicator field can also implicitly indicate the offset between the actual start location and the time domain symbol, and can obtain, according to the second indicator field, whether the actual start location is the start location of the time domain resource assignment. For example, the indication information is carried in the DCI. Assuming that the network device uses the first indicator field of 2 bits in the DCI to indicate the category of LBT, including the category 1, 2, and 4 of LBT; and uses the second indicator field of 1 bit in the DCI to indicate whether transmission starts from the start location or the boundary of a time domain symbol (for example, a first time domain symbol indicated by time domain resource assignment). For example, when the value of 1 bit of the second indicator field is 1, it means that the actual start location is a start scheduling location indicated by the "time domain resource assignment" field in the DCI. When the value of 1 bit of the second indicator field is 0, it means that the actual start location is not a start scheduling location indicated by the "time domain resource assignment" field in the DCI, and can be within a time domain symbol of the indicated start location or within a time domain symbol before and after the time domain symbol of the indicated start location. In other words, the second indicator field indicates whether the gap/LBT starts from the start location of a time domain symbol, or whether the gap/LBT starts from a middle location of a time domain symbol and ends at the end location of the time domain symbol. The former corresponds to starting transmission within the OS, and the latter corresponds to starting transmission from the start boundary of the OS.

Specifically, the following scenarios are included in this manner:

Scenario 1: the actual start location is not a start location of time domain resource assignment.

Specifically, step 22 includes: when the second indicator field indicates that the actual start location is not the start location of the time domain resource assignment, if the first indicator field indicates that the channel access type is a first channel access type, performing transmission from an actual start location that offsets by a first offset from the start location of the reference time domain symbol. Alternatively, step 22 includes: when the second indicator field indicates that the actual start location is not the start location of the time domain resource assignment, if the first indicator field indicates that the channel access type is a second channel access type, performing transmission from an actual start location that offsets by a second offset from the start location of the reference time domain symbol. The first channel access type is different from the second channel access type, and the first offset is different from the second offset. The first offset is one of 16 us and 25 us, and the second offset is the other of 16 us and 25 us.

This scenario is a scenario in which the transmission starts within a time domain symbol. When the first indicator field indicates the category 1 of LBT, the gap between the actual start location of the transmission and the start location of the reference time domain symbol is 16 us; when the first indicator field indicates the category 2 of the LBT, the gap between the actual start location of the transmission and the start location of the reference time domain symbol is 25 us; and when the first indicator field indicates the category 4 of the LBT, the second indicator field is ignored.

It should be noted that if the channel access type indicated by the first indicator field is the particular channel access type, the content indicated by the second indicator field is invalid, and the particular channel access type is the category 4 of LBT.

Furthermore, in this scenario, the reference time domain symbol includes: a first time domain symbol of the time domain resource assignment, or an $M^{th}$ time domain symbol before the start location of the time domain resource assignment, or an $N^{th}$ time domain symbol after the start location of the time domain resource assignment, where M and N are integers greater than or equal to 1. That is, the time domain symbol of the actual start location can be the first time domain symbol of the time domain resource assignment, or a time domain symbol before or after the start location of the time domain resource assignment.

Figure 3:
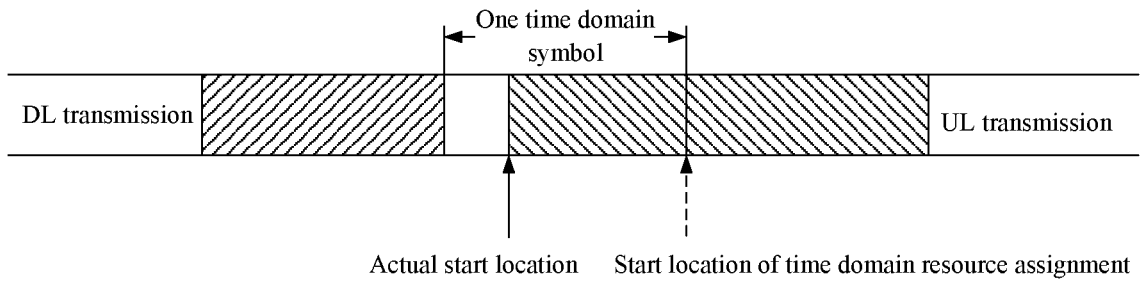
FIG. 3 is a first schematic diagram of a resource mapping relationship for transmission in a first scenario according to the embodiments of the present disclosure.

For example, the reference time domain symbol is the $M^{th}$ time domain symbol before the start location of the time domain resource assignment. When the actual start location of transmission starts within a time domain symbol, for uplink transmission, the network device indicates the channel access type (the category of LBT) and the actual start location of time domain transmission to the terminal. When the terminal uses the channel access type of the category 1 of LBT, it implicitly indicates that a gap is not greater than 16 us before UL transmission; when the terminal uses the channel access type of the category 2 of LBT, it implicitly indicates that LBT needs to be performed for 25 us before UL transmission. As shown in FIG. 3, UL transmission is after DL transmission, and a time domain symbol is reserved between the end location of DL transmission and the indicated start location of UL transmission to perform Tx/Rx conversion or Tx/Rx conversion and LBT. To make the gap between the two transmissions not greater than 16 us or 25 us, the actual start location of UL transmission needs to be in a time domain symbol before the start location of the time domain resource assignment (the indicated time domain resource). When the channel access type indicated by the first indicator field is the category 1 of LBT, the actual start location of UL transmission is: the start location of the time domain resource assignment (that is, the indicated time domain resource)−1OS+16 us. When the channel access type indicated by the first indicator field is category 2 of LBT, the actual start location of UL transmission is: the start location of the time domain resource assignment −1Os+25 us.

It should be noted that when the SCS is greater than 30 kHz, the number of time domain symbols (that is, the value of M) subtracted when calculating the actual start location depends on the number of time domain symbols reserved for Tx/Rx conversion and LBT. The value may be greater than 1. The value of M can be indicated in RRC, can also be indicated in DCI, or predefined (for example, directly specified by a protocol).

Figure 4:
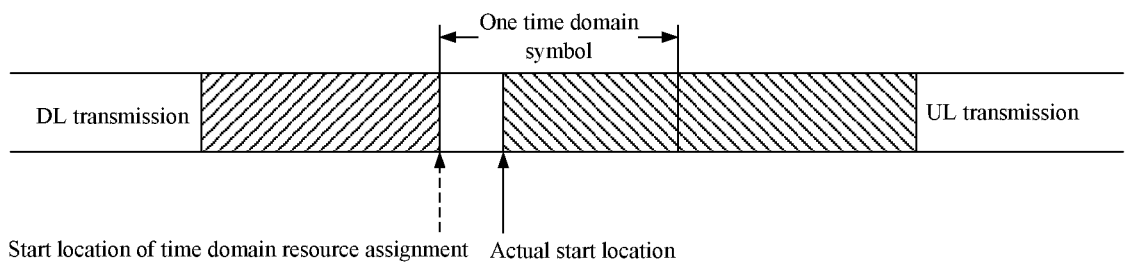
FIG. 4 is a second schematic diagram of a resource mapping relationship for transmission in a first scenario according to the embodiments of the present disclosure.

For example, the reference time domain symbol is the first time domain symbol of the time domain resource assignment. When the actual start location of transmission starts within a time domain symbol, for uplink transmission, the network device indicates the channel access type and the actual start location of the time domain transmission to the terminal. When the terminal uses the channel access type of the category 1 of LBT, it implicitly indicates that a gap is not greater than 16 us before UL transmission; when the terminal uses the channel access type of the category 2 of LBT, it implicitly indicates that LBT needs to be performed for 25 us before UL transmission. As shown in FIG. 4, UL transmission is after DL transmission, a time domain symbol is reserved between the end location of DL transmission and the indicated start location of UL transmission to perform Tx/Rx conversion or Tx/Rx conversion and LBT. To make the gap between the two transmissions not greater than 16 us or 25 us, the actual start location of UL transmission needs to be in an indicated first time domain symbol. When the channel access type indicated by the first indicator field is the category 1 of LBT, the actual start location of UL transmission is: the start location of the time domain resource assignment (that is, the indicated time domain resource)+16 us. When the channel access type indicated by the first indicator field is category 2 of LBT, the actual start location of UL transmission is: the start location of the time domain resource assignment+25 us.

It should be noted that when the SCS is greater than 30 kHz, an offset of multiple time domain symbols can also be performed when calculating the actual start location. That is, the reference time domain symbol is the $N^{th}$ time domain symbol after the start location of the time domain resource assignment. The actual start location is: the start location of the time domain resource assignment+N*OS+25 us. The number of time domain symbols (that is, the value of N) that are offset depends on the number of time domain symbols reserved for Tx/Rx conversion and LBT. The value may be greater than 1. The value of N can be indicated in RRC, can also be indicated in DCI, or predefined (for example, directly specified by a protocol).

Further, considering the influence of a transmission delay between the network device and the terminal, the actual start location may need to be delayed by a Timing Advance (TA). Therefore, a third indicator field of one bit can be added to the indication information, to indicate whether the transmission needs to be delayed by one TA. Specifically, the indication information includes: a third indicator field used to indicate whether the actual start location offsets by a TA. For example, when the value of 1 bit of the third indicator field is 1, it indicates that the transmission is delayed by a TA, and when the value of 1 bit of the third indicator field is 0, it indicates that no additional delay of TA is required, or vice versa.

For example, the terminal uses category 2 of LBT for channel access. In a scenario in which the actual start location is within the $M^{th}$ time domain symbol before the start location of the time domain resource assignment, when the value of this bit is 1, the actual start location is: the start location of time domain resource assignment −M*OS+25 us+TA. In a scenario in which the actual start location is within the first time domain symbol of the time domain resource assignment, when the value of this bit is 1, the actual start location is: the start location of time domain resource assignment+25 us+TA. In a scenario in which the actual start location is within the $N^{th}$ time domain symbol after the start location of the time domain resource assignment, when the value of this bit is 1, the actual start location is: the start location of time domain resource assignment+ N*OS+25 us+TA.

Scenario 2: the actual start location is a start location of time domain resource assignment.

Step 22 includes: when the second indicator field indicates that the actual start location is the start location of the time domain resource assignment, performing transmission from the start location of the time domain resource assignment.

Figure 5:
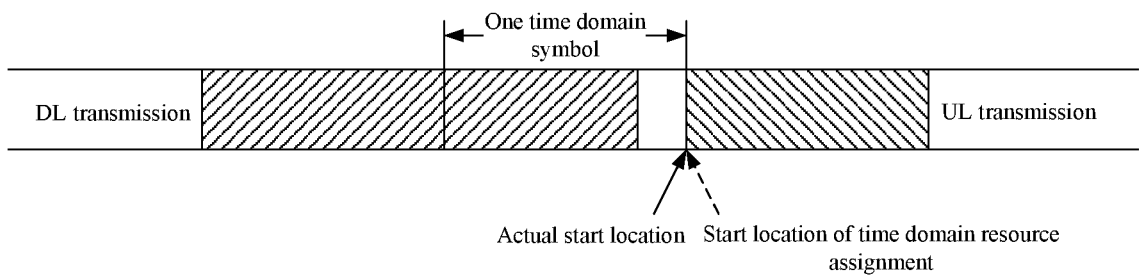
FIG. 5 is a schematic diagram of a resource mapping relationship for transmission in a second scenario according to the embodiments of the present disclosure.

As shown in FIG. 5, UL transmission is after DL transmission, a time domain symbol is reserved between the end location of DL transmission and the indicated start location of UL transmission to perform Tx/Rx conversion or Tx/Rx conversion and LBT. When the indication information indicates that the actual start location of the UL transmission is the start location of the time domain resource assignment (the indicated time domain resource), transmission starts from the indicated time domain resource.

This scenario is a scenario in which the transmission starts from a start location of a time domain symbol, and the transmission starts from the start location of the time domain resource assignment. When the channel access type indicated by the first indicator field is the particular channel access type, the content indicated by the second indicator field is invalid, and the particular channel access type is the category 4 of LBT.

Manner 2: The indication information includes: a fourth indicator field used to indicate whether the channel access type is a particular channel access type; a fifth indicator field used to indicate whether the actual start location is the start location of time domain resource assignment; and a sixth indicator field used to indicate the offset between the actual start location and the start location of the reference time domain symbol.

The offset includes: 16 us, 25 us, or 25 us+TA. The particular channel access type can be category 4 of LBT. When the terminal uses category 4 of LBT, the terminal needs to continue to perform LBT before transmission until it is detected that a channel is empty. The terminal can learn whether the used channel access type is category 4 of LBT according to the fourth indicator field. For example, the indication information is carried in the DCI. It is assumed that the network device uses the fourth indicator field of 1 bit in the DCI to indicate whether the channel access type is category 4 of LBT. For example, when the value of the 1 bit of the fourth indicator field is 1, it means that the channel access type is category 4 of LBT, and when the value of the 1 bit of the fourth indicator field is 0, it means that the channel access type is not category 4 of LBT, that is, category 1 of LBT or category 2 of LBT.

Further, the network device can also use a fifth indicator field of 1 bit in the DCI to indicate whether the transmission starts from the start location or boundary of a time domain symbol (such as the first time domain symbol indicated by the time domain resource assignment). For example, when the value of the 1 bit of the fifth indicator field is 1, it means that the actual start location is a start scheduling location indicated by the "time domain resource assignment" field in the DCI. When the value of 1 bit of the fifth indicator field is 0, it means that the actual start location is not a start scheduling location indicated by the "time domain resource assignment" field in the DCI, and can be within a time domain symbol of the indicated start location or within a time domain symbol before and after the time domain symbol of the indicated start location. In other words, the fifth indicator field indicates whether the gap/LBT starts from the start location of a time domain symbol, or whether the gap/LBT starts from a middle location of a time domain symbol and ends at the end location of the time domain symbol. The former corresponds to starting transmission within the OS, and the latter corresponds to starting transmission from the start boundary of the OS.

Further, the network device can also use a sixth indicator field of 2 bits or 1 bit in the DCI to indicate the offset between the actual start location of the transmission and the start location of the reference time domain symbol, to indicate the actual start location of the transmission. The reference time domain symbol includes: a first time domain symbol of the time domain resource assignment, or an $M^{th}$ time domain symbol before the start location of the time domain resource assignment, or an $N^{th}$ time domain symbol after the start location of the time domain resource assignment, where M and N are integers greater than or equal to 1.

For example, the reference time domain symbol is the first time domain symbol of the time domain resource assignment. For example, when the values of 2 bits of the sixth indicator field are 00, it means that the actual start location is: the start location of the reference time domain symbol+16 us. For example, when the values of 2 bits of the sixth indicator field are 01, it means that the actual start location is: the start location of the reference time domain symbol+25 us. For example, when the values of 2 bits of the sixth indicator field are 10, it means that the actual start location is: the start location of the reference time domain symbol+25 us+TA. For example, when the value of 2 bits of the sixth indicator field is 11, it means an invalid bit.

It should be noted that without considering the influence of a transmission delay, the TA in the actual transmission location may not be considered, and the sixth indicator field can use 1 bit to indicate the actual start location. For example, when the value of 1 bit of the sixth indicator field is 0, it means that the actual start location is: the start location of the reference time domain symbol+16 us. For example, when the value of 1 bit of the sixth indicator field is 1, it means that the actual start location is: the start location of the reference time domain symbol+25 us.

As mentioned in the above manner 1, when the gap between two transmissions is less than 16 us, the category 1 of LBT can be used; and when the gap between two transmissions is less than 25 us, the category 2 of LBT can be used. That is, if the terminal uses category 1 of LBT, the gap between two transmissions needs to be at least 16 us; and if the terminal uses category 2 of LBT, the gap between two transmissions needs to be at least 25 us. Then, when the sixth indicator field indicates the offset between the actual start location and the start location of the reference time domain symbol, the sixth indicator field also implicitly indicates the channel access type adopted by the terminal. For example, when the values of 2 bits of the sixth indicator field are 00, it means that the actual start location is: the start location of the reference time domain symbol+16 us, and implicitly indicates that the terminal uses the category 1 of LBT. When the values of 2 bits of the sixth indicator field are 01, it means that the actual start location is: the start location of the reference time domain symbol+25 us. When the values of 2 bits are 10, it means that the actual start location is: the start location of the reference time domain symbol+25 us+TA. When the values of the 2 bits are "01" or "10", it also implicitly indicates that the terminal uses category 2 of LBT.

In this manner, step 22 includes: when the fourth indicator field indicates that the channel access type is not the particular channel access type and the fifth indicator field indicates that the actual start location is not the start location of the time domain resource assignment, obtaining the actual start location and the channel access type according to the sixth indicator field and performing transmission from the actual start location. For example, when the fourth indicator field indicates that the access type is not category 4 of LBT, that is, the value is 0, and the fifth indicator field indicates that the actual start location is not the start location of the time domain resource assignment, that is, the value is 0, the actual start location of transmission and the channel access type of the terminal are obtained according to 2 bits of the sixth indicator field.

Alternatively, step 22 includes: when the fourth indicator field indicates that the channel access type is not the particular channel access type and the fifth indicator field indicates that the actual start location is the start location of the time domain resource assignment, obtaining the channel access type according to the sixth indicator field and performing transmission from the start location of the time domain resource assignment. For example, when the fourth indicator field indicates that the access type is not category 4 of LBT, that is, the value is 0, and the fifth indicator field indicates that the actual start location is the start location of the time domain resource assignment, that is, the value is 1, the channel access type of the terminal is obtained according to 2 bits of the sixth indicator field and transmission is performed from the start location of the time domain resource assignment.

Alternatively, step 22 includes: when the fourth indicator field indicates that the channel access type is the particular channel access type, ignoring the fifth indicator field and the sixth indicator field. For example, the fourth indicator field indicates that the access type is category 4 of LBT, that is, the value is 1. In this case, the terminal ignores interpretation of the fifth indicator field and the sixth indicator field.

The above describes different implementations of how the indication information indicates the actual start location of the transmission, as well as different processing methods of the terminal for different actual start locations. The following embodiments of the present disclosure further introduce the behavior of the terminal after the terminal knows the actual start location of the transmission. In the embodiments of the present disclosure, after the terminal knows the actual start location of the transmission, the method further includes: sending preset information in a time domain resource after the actual start location in the reference time domain symbol, where the preset information includes: at least one of a reservation signal, data, a reference signal, and an extended Cyclic Prefix (extended CP). That is, the terminal can transmit at least one of a reservation signal, data, a reference signal, an extended cyclic prefix, and other signals in some time domain symbols after transmission starts. The data can be a Physical Uplink Shared Channel (PUSCH) and the reference signal may be a Sounding Reference Signal (SRS).

In the information transmission method in an unlicensed band in the embodiments of the present disclosure, the start location of uplink transmission of the terminal can be the start location of a time domain symbol, or can be within a time domain symbol. A start location of transmission is more flexible. This can resolve the problem of granularity matching between information scheduling and unlicensed band transmission, and further ensure normal uplink transmission in an unlicensed band.

The above embodiments introduce the information transmission method in an unlicensed band in different scenarios, and a corresponding terminal is further introduced below with reference to the accompanying drawings.

Figure 6:
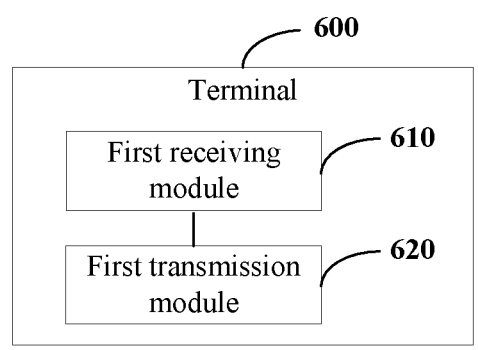
FIG. 6 is a schematic structural diagram of modules of a terminal according to an embodiment of the present disclosure.

As shown in FIG. 6, the terminal 600 of the embodiments of the present disclosure can perform details of the method in the above embodiment: receiving indication information; and performing transmission from an actual start location according to the indication information, where the actual start location is a start location of a reference time domain symbol, or the actual start location is within the reference time domain symbol; and achieve the same effect. The terminal 600 specifically includes the following functional modules:

a first receiving module 610, configured to receive indication information; and a first transmission module 620, configured to perform transmission from an actual start location according to the indication information, where the actual start location is a start location of a reference time domain symbol, or the actual start location is within the reference time domain symbol.

The indication information includes:

a first indicator field used to indicate a channel access type; and a second indicator field used to indicate whether the actual start location is a start location of time domain resource assignment.

The first transmission module 620 includes:

a first transmission submodule, configured to: when the second indicator field indicates that the actual start location is not the start location of the time domain resource assignment, if the first indicator field indicates that the channel access type is a first channel access type, perform transmission from an actual start location that offsets by a first offset from the start location of the reference time domain symbol.

The first transmission module 620 includes:

a second transmission submodule, configured to: when the second indicator field indicates that the actual start location is not the start location of the time domain resource assignment, if the first indicator field indicates that the channel access type is a second channel access type, perform transmission from an actual start location that offsets by a second offset from the start location of the reference time domain symbol.

The first offset is one of 16 us and 25 us, and the second offset is the other of 16 us and 25 us.

The terminal 600 further includes:

a processing module, configured to: when the second indicator field indicates that the actual start location is the start location of the time domain resource assignment, perform transmission from the start location of the time domain resource assignment.

The indication information further includes:

a third indicator field used to indicate whether the actual start location offsets by a TA.

The indication information includes: a fourth indicator field used to indicate whether the channel access type is a particular channel access type;

a fifth indicator field used to indicate whether the actual start location is a start location of time domain resource assignment; and a sixth indicator field used to indicate an offset between the actual start location and the start location of the reference time domain symbol.

The first transmission module 620 includes:

a third transmission submodule, configured to: when the fourth indicator field indicates that the channel access type is not the particular channel access type and the fifth indicator field indicates that the actual start location is not the start location of the time domain resource assignment, obtain the actual start location and the channel access type according to the sixth indicator field and perform transmission from the actual start location.

The first transmission module 620 includes:

a fourth transmission submodule, configured to: when the fourth indicator field indicates that the channel access type is not the particular channel access type and the fifth indicator field indicates that the actual start location is not the start location of the time domain resource assignment, obtain the actual start location and the channel access type according to the sixth indicator field and perform transmission from the actual start location.

The first transmission module 620 includes:

a fifth transmission submodule, configured to: when the fourth indicator field indicates that the channel access type is the particular channel access type, ignore the fifth indicator field and the sixth indicator field.

The offset includes: 16 us, 25 us, or 25 us+TA.

The reference time domain symbol includes: a first time domain symbol of the time domain resource assignment, or an $M^{th}$ time domain symbol before the start location of the time domain resource assignment, or an $N^{th}$ time domain symbol after the start location of the time domain resource assignment, where M and N are integers greater than or equal to 1.

The terminal 600 further includes:

a second transmission module, configured to: send preset information in a time domain resource after the actual start location in the reference time domain symbol, where the preset information includes: at least one of a reservation signal, data, a reference signal, and an extended cycle prefix.

It should be noted that the start location of uplink transmission of the terminal in the embodiments of the present disclosure can be the start location of a time domain symbol, or can be within a time domain symbol. A start location of transmission is more flexible. This can resolve the problem of granularity matching between information scheduling and unlicensed band transmission, and further ensure normal uplink transmission in an unlicensed band.

Figures 7, 8:
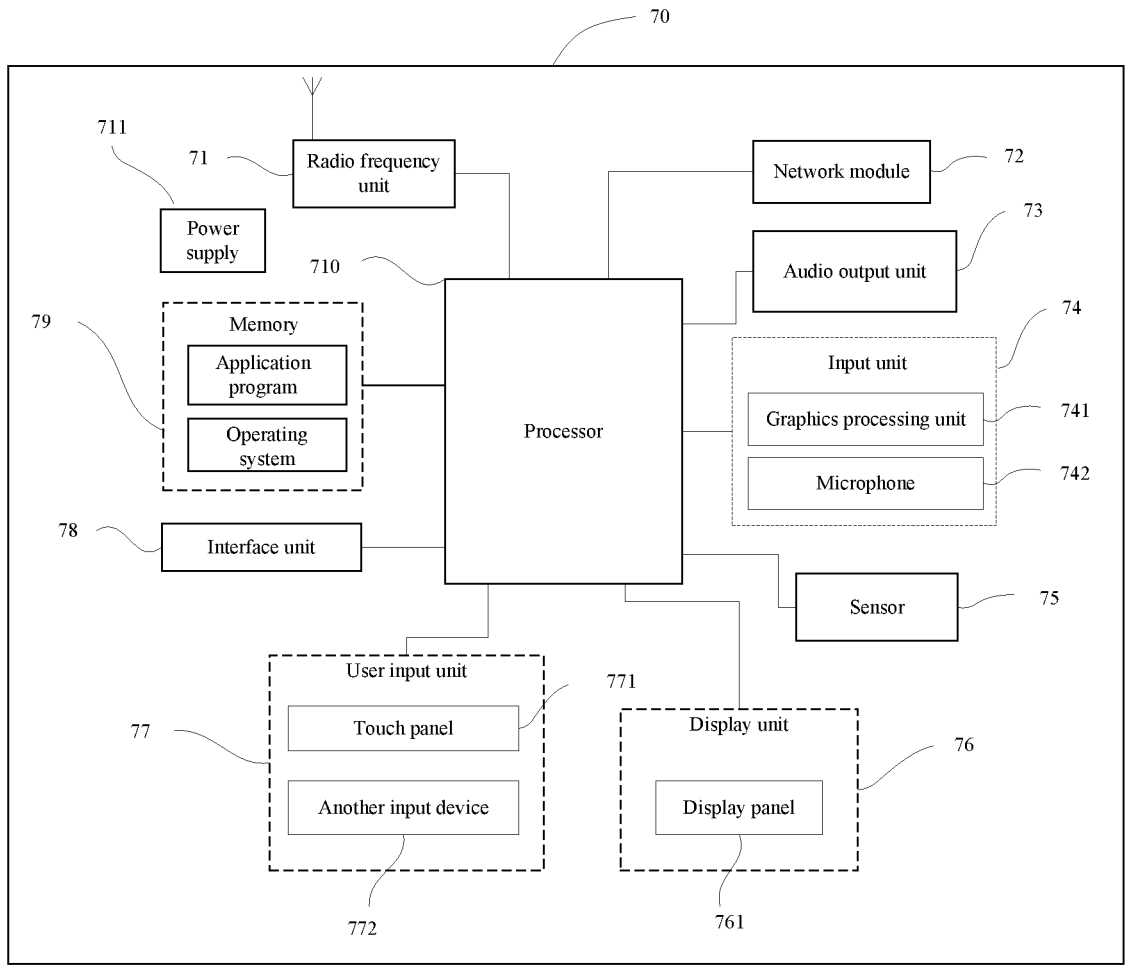
FIG. 7 is a block diagram of a terminal according to an embodiment of the present disclosure.
FIG. 8 is a schematic flowchart of an information transmission method in an unlicensed band on a network device side according to an embodiment of the present disclosure.

To better implement the foregoing objective, further, FIG. 7 is a schematic structural diagram of hardware of a terminal according to the embodiments of the present disclosure. A terminal 70 includes, but is not limited to, components such as a radio frequency unit 71, a network module 72, an audio output unit 73, an input unit 74, a sensor 75, a display unit 76, a user input unit 77, an interface unit 78, a memory 79, a processor 710, and a power supply 711. Those skilled in the art may understand that the terminal structure shown in FIG. 7 does not constitute a limitation on the terminal. The terminal may include more or fewer components than those shown in the figure, or some components may be combined, or there may be a different component arrangement. In the embodiments of the present disclosure, the terminal includes, but is not limited to, a mobile phone, a tablet computer, a notebook computer, a palmtop computer, a vehicle-mounted terminal, a wearable device, a pedometer, or the like.

The radio frequency unit 71 is configured to: receive indication information; and The processor 710 is configured to obtain an actual start location of transmission according to the indication information, where the actual start location is a start location of a reference time domain symbol, or the actual start location is within the reference time domain symbol.

The start location of uplink transmission of the terminal in the embodiments of the present disclosure can be the start location of a time domain symbol, or can be within a time domain symbol. A start location of transmission is more flexible. This can resolve the problem of granularity matching between information scheduling and unlicensed band transmission, and further ensure normal uplink transmission in an unlicensed band.

It should be understood that in the embodiments of the present disclosure, the radio frequency unit 71 can be configured to receive and send information or receive and send signal during calls. Specifically, the radio frequency unit 71 receives downlink data from a base station, and transmits the downlink data to the processor 710 for processing. In addition, the radio frequency unit 71 sends uplink data to the base station. Generally, the radio frequency unit 71 includes but is not limited to an antenna, at least one amplifier, a transceiver, a coupler, a low noise amplifier, a duplexer, and the like. In addition, the radio frequency unit 71 may further communicate with another device by using a wireless communication system and network.

The terminal provides a user with wireless broadband Internet access through the network module 72, for example, helps the user send and receive emails, browse web pages, and access streaming media.

The audio output unit 73 may convert audio data received by the radio frequency unit 71 or the network module 72 or stored in the memory 79 into an audio signal and output the audio signal as a sound. Moreover, the audio output unit 73 may further provide audio output (for example, call signal receiving sound and message receiving sound) related to a specific function performed by the terminal 70. The audio output unit 73 includes a speaker, a buzzer, a telephone receiver, and the like.

The input unit 74 is configured to receive audio or video signals. The input unit 74 may include a Graphics Processing Unit (GPU) 741 and a microphone 742. The graphics processing unit 741 processes image data of a static picture or a video obtained by an image capturing apparatus (for example, a camera) in a video capturing mode or an image capturing mode. A processed image frame may be displayed on the display unit 76. An image frame processed by the graphics processing unit 741 may be stored in the memory 79 (or another storage medium) or sent by the radio frequency unit 71 or the network module 72. The microphone 742 may receive a sound and can process such sound into audio data. The audio data obtained through processing may be converted, in a telephone call mode, into a format that can be sent to a mobile communications base station via the radio frequency unit 71 for output.

The terminal 70 further includes at least one sensor 75, for example, a light sensor, a motion sensor, and another sensor. Specifically, the light sensor includes an ambient light sensor and a proximity sensor, where the ambient light sensor can adjust brightness of a display panel 761 based on brightness of ambient light, and the proximity sensor can turn off the display panel 761 and/or backlight when the terminal 70 is moved towards the ear. As a type of motion sensor, an accelerometer sensor may detect an acceleration value in each direction (generally, three axes), and detect a value and a direction of gravity when the accelerometer sensor is static, and may be configured to recognize a terminal posture (for example, screen switching between landscape and portrait modes, a related game, or magnetometer posture calibration), and perform a function related to vibration recognition (for example, a pedometer or a knock), and the like. The sensor 75 may further include a fingerprint sensor, a pressure sensor, an iris sensor, a molecular sensor, a gyroscope, a barometer, a hygrometer, a thermometer, an infrared sensor, and the like. Details are not described herein again.

The display unit 76 is configured to display information entered by a user or information provided for a user. The display unit 76 may include the display panel 761, and the display panel 761 may be configured in a form of a Liquid Crystal Display (LCD), an Organic Light-Emitting Diode (OLED), or the like.

The user input unit 77 may be configured to receive input numeral or character information, and generate key signal input related to user setting and functional control of the terminal. Specifically, the user input unit 77 includes a touch panel 771 and another input device 772. The touch panel 771 is also referred to as a touchscreen, and may collect a touch operation performed by a user on or near the touch panel 771 (such as an operation performed by a user on the touch panel 771 or near the touch panel 771 by using any proper object or accessory, such as a finger or a stylus). The touch panel 771 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, and sends the touch point coordinates to the processor 710, and can receive and execute a command sent by the processor 710. In addition, the touch panel 771 may be implemented by using multiple types such as a resistive type, a capacitive type, an infrared ray, and a surface acoustic wave. In addition to the touch panel 771, the user input unit 77 may further include another input device 772. Specifically, the another input device 772 may include, but is not limited to, a physical keyboard, functional keys (for example, a volume control key and a switch key), a trackball, a mouse, and a joystick. Details are not described herein again.

Further, the touch panel 771 may cover the display panel 761. When detecting the touch operation on or near the touch panel 771, the touch panel 771 transmits the touch operation to the processor 710 to determine a type of a touch event, and then the processor 710 provides corresponding visual output on the display panel 761 based on the type of the touch event. Although in FIG. 7, the touch panel 771 and the display panel 761 are configured as two independent components to implement input and output functions of the terminal, in some embodiments, the touch panel 771 and the display panel 761 can be integrated to implement the input and output functions of the terminal. Details are not limited herein.

The interface unit 78 is an interface connecting an external apparatus to the terminal 70. For example, the external apparatus may include a wired or wireless headset jack, an external power supply (or a battery charger) port, a wired or wireless data port, a memory card port, a port for connecting an apparatus having an identification module, an audio input/output (I/O) port, a video I/O port, a headset jack, and the like. The interface unit 78 may be configured to receive input (for example, data information and power) from the external apparatus and transmit the received input to one or more elements in the terminal 70, or may be configured to transmit data between the terminal 70 and the external apparatus.

The memory 79 may be configured to store software programs and various data. The memory 79 may mainly include a program storage area and a data storage area. The program storage area may store an operating system, an application required by at least one function (such as a sound play function or an image play function), and the like. The data storage area may store data (such as audio data or an address book) created based on use of the mobile phone, and the like. In addition, the memory 79 may include a high-speed random access memory, and may further include a nonvolatile memory, for example, at least one magnetic disk storage device, a flash storage device, or another volatile solid-state storage device.

The processor 710 is a control center of the terminal, and connects all parts of the entire terminal by using various interfaces and lines. By running or executing a software program and/or a module stored in the memory 79 and invoking data stored in the memory 79, the processor 710 performs various functions of the terminal and data processing, to perform overall monitoring on the terminal. The processor 710 may include one or more processing units. Optionally, the processor 710 may integrate an application processor and a modem processor. The application processor mainly deals with an operating system, a user interface, an application, and the like. The modem processor mainly deals with wireless communication. It may be understood that, alternatively, the modem processor may not be integrated into the processor 710.

The terminal 70 may further include a power supply 711 (such as a battery) that supplies power to each component. Optionally, the power supply 711 may be logically connected to the processor 710 by using a power management system, to implement functions such as charging, discharging, and power consumption management by using the power management system.

In addition, the terminal 70 includes some function modules not shown, and details are not described herein again.

Optionally, an embodiment of the present disclosure further provides a terminal, including a processor 710, a memory 79, a computer program stored in the memory 79 and executable on the processor 710. When the computer program is executed by the processor 710, the processes of the embodiments of the information transmission method in an unlicensed band are implemented, with the same technical effect achieved. To avoid repetition, details are not described herein again. The terminal may be a wireless terminal or a wired terminal. The wireless terminal may be a device providing voice and/or other service data connectivity to a user, a handheld device with a wireless connection function, or another processing device connected to a wireless modem. The wireless terminal may communicate with one or more core networks through a Radio Access Network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, the wireless terminal may be a device such as a Personal Communication Service (PCS) phone, a cordless telephone set, a Session Initiation Protocol (SIP) phone, a Wireless Local Loop (WLL) station, or a Personal Digital Assistant (PDA). The wireless terminal may also be referred to as a system, a Subscriber Unit, a Subscriber Station, a Mobile Station, a Mobile console, a Remote Station, a Remote Terminal, an Access Terminal, a User Terminal, a User Agent, or a User Device or User Equipment. This is not limited herein.

An embodiment of the present disclosure further provides a computer-readable storage medium, where the computer-readable storage medium stores a computer program. When the computer program is executed by a processor, the processes of the embodiment of the information transmission method in an unlicensed band are implemented, with the same technical effects achieved. To avoid repetition, details are not described again herein. The computer-readable storage medium may be a Read-Only Memory (ROM), a Random Access Memory (RAM), a magnetic disk, a compact disc, or the like.

The foregoing embodiment describes the information transmission method in an unlicensed band on the terminal side in the present disclosure. The following embodiment further describes the information transmission method in an unlicensed band on a network device side with reference to the accompanying drawings.

As shown in FIG. 8, the information transmission method in an unlicensed band in the embodiments of the present disclosure is applied to a network device side. The method includes the following steps:

Step 81: Send indication information, where the indication information is used to indicate an actual start location for transmission, and the actual start location is a start location of a reference time domain symbol, or the actual start location is within the reference time domain symbol.

The indication information is used to indicate an actual start location of transmission, and the indication information can directly indicate the actual start location of transmission through one indicator field, or indirectly indicate the actual start location of transmission through multiple indicator fields. Further, the indication information may be carried in DCI or the indication information may be carried in RRC.

In the embodiments of the present disclosure, the reference time domain symbol can refer to any time domain symbol (for example, an OFDM symbol). That is, the actual start location for transmission can be a start location of a time domain symbol, or can be within a time domain symbol. "Within" herein refers to locations other than the start location. In this way, a start location of transmission is more flexible. This can resolve the problem of granularity matching between transmission scheduling and unlicensed band transmission, and ensure normal uplink transmission in an unlicensed band.

For example, the indication information performs indication through multiple indicator fields, and indication manners of the indication information include but are not limited to:

Manner 3: the indication information includes a first indicator field used to indicate a channel access type; and a second indicator field used to indicate whether the actual start location is a start location of time domain resource assignment.

The channel access type includes, but is not limited to: category 1, category 2, and category 4 of LBT. For example, the indication information is carried in DCI. It is assumed that the network device uses the first indicator field of 2 bits in the DCI to indicate the category of LBT, including category 1, 2, and 4 of LBT. For the access forms of these channel access types, refer to the introduction in manner 1 of the embodiments on the terminal side, and therefore details are not repeated herein.

The channel access type includes a first channel access type and/or a second channel access type, the first channel access type implicitly indicates that there is a first offset between the actual start location and the start location of the reference time domain symbol, and the second channel access type implicitly indicates that there is a second offset between the actual start location and the start location of the reference time domain symbol. The first channel access type is different from the second channel type, and the first offset is different from the second offset. The first offset is one of 16 us and 25 us, and the second offset is the other of 16 us and 25 us. That is, different channel access types correspond to different gaps, that is, the first indicator field can also implicitly indicate the gap offset (or called an offset) between the actual start location and the time domain symbol. For example, when the gap between two transmissions is less than 16 us, category 1 of LBT can be used. When the gap between two transmissions is less than 25 us, category 2 of LBT can be used. That is, if the terminal uses category 1 of LBT, the gap between two transmissions is less than 16 us; and if the terminal uses category 2 of LBT, the LBT time needs to be 25 us.

Further, considering the influence of a transmission delay between the network device and the terminal, the actual start location may need to be delayed by a TA. Therefore, a third indicator field of one bit can be added to the indication information, to indicate whether the transmission needs to be delayed by one TA. Specifically, the indication information further includes: a third indicator field used to indicate whether the actual start location offsets by a TA. For example, when the value of 1 bit of the third indicator field is 1, it indicates that the transmission is delayed by a TA, and when the value of 1 bit of the third indicator field is 0, it indicates that no additional delay of TA is required, or vice versa. For example, the terminal uses category 2 of LBT for channel access. In a scenario in which the actual start location is within a time domain symbol before the start location of the time domain resource assignment, when the value of this bit is 1, the actual start location is: the start location of time domain resource assignment−M*OS+25 us+TA. In a scenario in which the actual start location is within a time domain symbol after the start location of the time domain resource assignment, when the value of this bit is 1, the actual start location is: the start location of time domain resource assignment+25 us+TA, or the start location of time domain resource assignment+N*OS+25 us+TA.

Manner 4: The indication information includes: a fourth indicator field used to indicate whether the channel access type is a particular channel access type; a fifth indicator field used to indicate whether the actual start location is the start location of time domain resource assignment; and a sixth indicator field used to indicate the offset between the actual start location and the start location of the reference time domain symbol.

The offset includes: 16 us, 25 us, or 25 us+TA. The particular channel access type can be category 4 of LBT. When the terminal uses category 4 of LBT, the terminal needs to continue to perform LBT before transmission until it is detected that a channel is empty. The terminal can learn whether the used channel access type is category 4 of LBT according to the fourth indicator field. For example, the indication information is carried in the DCI. It is assumed that the network device uses the fourth indicator field of 1 bit in the DCI to indicate whether the channel access type is category 4 of LBT. For example, when the value of the 1 bit of the fourth indicator field is 1, it means that the channel access type is category 4 of LBT, and when the value of the 1 bit of the fourth indicator field is 0, it means that the channel access type is not category 4 of LBT, that is, category 1 of LBT or category 2 of LBT.

The reference time domain symbol includes: a first time domain symbol of the time domain resource assignment, or an $M^{th}$ time domain symbol before the start location of the time domain resource assignment, or an $N^{th}$ time domain symbol after the start location of the time domain resource assignment, where M and N are integers greater than or equal to 1. Further, the network device can also use a sixth indicator field of 2 bits or 1 bit in the DCI to indicate the offset between the actual start location of the transmission and the start location of the reference time domain symbol, to indicate the actual start location of the transmission. The reference time domain symbol includes: a first time domain symbol of the time domain resource assignment, or an $M^{th}$ time domain symbol before the start location of the time domain resource assignment, or an $N^{th}$ time domain symbol after the start location of the time domain resource assignment, where M and N are integers greater than or equal to 1. For example, the reference time domain symbol is the first time domain symbol of the time domain resource assignment. For example, when the value of 2 bits of the sixth indicator field is 00, it means that the actual start location is: the start location of the reference time domain symbol+16 us. For example, when the value of 2 bits of the sixth indicator field is 01, it means that the actual start location is: the start location of the reference time domain symbol+25 us. For example, when the value of 2 bits of the sixth indicator field is 10, it means that the actual start location is: the start location of the reference time domain symbol+25 us+TA. For example, when the value of 2 bits of the sixth indicator field is 11, it means an invalid bit. It should be noted that without considering the influence of a transmission delay, the TA in the actual transmission location may not be considered, and the sixth indicator field can use 1 bit to indicate the actual start location. For example, when the value of 1 bit of the sixth indicator field is 0, it means that the actual start location is: the start location of the reference time domain symbol+16 us. For example, when the value of 1 bit of the sixth indicator field is 1, it means that the actual start location is: the start location of the reference time domain symbol+25 us.

In the information transmission method in an unlicensed band in the embodiments of the present disclosure, the network device uses the indication information to indicate that the start location of uplink transmission of the terminal can be the start location of a time domain symbol, or can be within a time domain symbol. A start location of transmission is more flexible. This can resolve the problem of granularity matching between information scheduling and unlicensed band transmission, and further ensure normal uplink transmission in an unlicensed band.

The information transmission methods in an unlicensed band in different scenarios are separately described in detail in the foregoing embodiment. A network device corresponding to the method is further described in the following embodiment with reference to the accompanying drawings.

Figure 9:
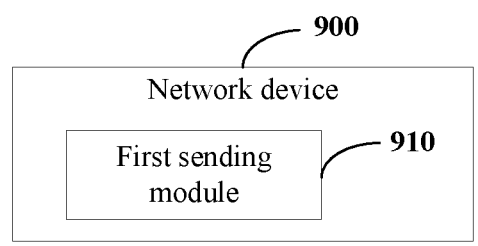
FIG. 9 is a schematic structural diagram of modules of a network device according to an embodiment of the present disclosure.

As shown in FIG. 9, the network device 900 of the embodiments of the present disclosure can perform details of the method in the above embodiment: sending indication information, where the indication information is used to indicate an actual start location for transmission, and the actual start location is a start location of a reference time domain symbol, or the actual start location is within the reference time domain symbol; and achieve the same effect. The network device 900 specifically includes the following functional modules: a first sending module 910, configured to send indication information, where the indication information is used to indicate an actual start location for transmission, and the actual start location is a start location of a reference time domain symbol, or the actual start location is within the reference time domain symbol.

The indication information includes: a first indicator field used to indicate a channel access type; and a second indicator field used to indicate whether the actual start location is a start location of time domain resource assignment.

The channel access type includes a first channel access type and/or a second channel access type, the first channel access type implicitly indicates that there is a first offset between the actual start location and the start location of the reference time domain symbol, and the second channel access type implicitly indicates that there is a second offset between the actual start location and the start location of the reference time domain symbol.

The first offset is one of 16 us and 25 us, and the second offset is the other of 16 us and 25 us.

The indication information further includes: a third indicator field used to indicate whether the actual start location offsets by a TA.

The indication information includes:
a fourth indicator field used to indicate whether the channel access type is a particular channel access type;
a fifth indicator field used to indicate whether the actual start location is a start location of time domain resource assignment; and
a sixth indicator field used to indicate an offset between the actual start location and the start location of the reference time domain symbol.

The offset includes: 16 us, 25 us, or 25 us+TA.

The reference time domain symbol includes: a first time domain symbol of the time domain resource assignment, or an $M^{th}$ time domain symbol before the start location of the time domain resource assignment, or an $N^{th}$ time domain symbol after the start location of the time domain resource assignment, where M and N are integers greater than or equal to 1.

It should be noted that, the network device in the embodiments of the present disclosure uses the indication information to indicate that the start location of uplink transmission of the terminal can be the start location of a time domain symbol, or can be within a time domain symbol. A start location of transmission is more flexible. This can resolve the problem of granularity matching between information scheduling and unlicensed band transmission, and further ensure normal uplink transmission in an unlicensed band.

It should be noted that, division of the modules of the network device and the terminal is merely logical function division, and in actual implementation, the modules may be all or partially integrated into one physical entity, or may be physically separated. In addition, these modules may all be implemented in the form of software being invoked by processing elements; or may all be implemented in the form of hardware; or some of the modules may be implemented in the form of software being invoked by processing elements, and some of the modules may be implemented in the form of hardware. For example, the determining module may be a separately disposed processing element, or may be integrated into a chip of the foregoing apparatus for implementation. In addition, the determining module may also be stored in the memory of the foregoing apparatus in the form of program code, and a processing element of the foregoing apparatus invokes the program code and performs the functions of the foregoing determining module. The implementation of other modules is similar thereto. In addition, all or some of these modules may be integrated together or implemented independently. The processing element herein may be an integrated circuit having a signal processing capability. During implementation, the steps of the foregoing method or the foregoing modules can be completed by hardware integrated logic circuits in the processor element or instructions in the form of software.

For example, the modules may be configured as one or more integrated circuits for implementing the foregoing method, for example, one or more Application Specific Integrated Circuits (ASICs), one or more microprocessors (digital signal processor, hereafter referred to as "DSP"), or one or more Field Programmable Gate Arrays (FPGAs). For another example, when a module above is implemented by invoking program code by using a processing element, the processing element may be a general-purpose processor, for example, a Central Processing Unit (CPU) or another processor that can invoke program code. For another example, these modules may be integrated together, and implemented in a form of a system-on-a-chip (SOC).

To better achieve the foregoing objective, an embodiment of the present disclosure further provides a network device, including a processor, a memory, and a computer program stored in the memory and executable on the processor, and when the processor executes the computer program, the steps of the information transmission method in an unlicensed band are implemented. An embodiment of the present disclosure further provides a computer-readable storage medium, where the computer-readable storage medium stores a computer program, and when the computer program is executed by a processor, the steps of the information transmission method in an unlicensed band are implemented.

Figure 10:
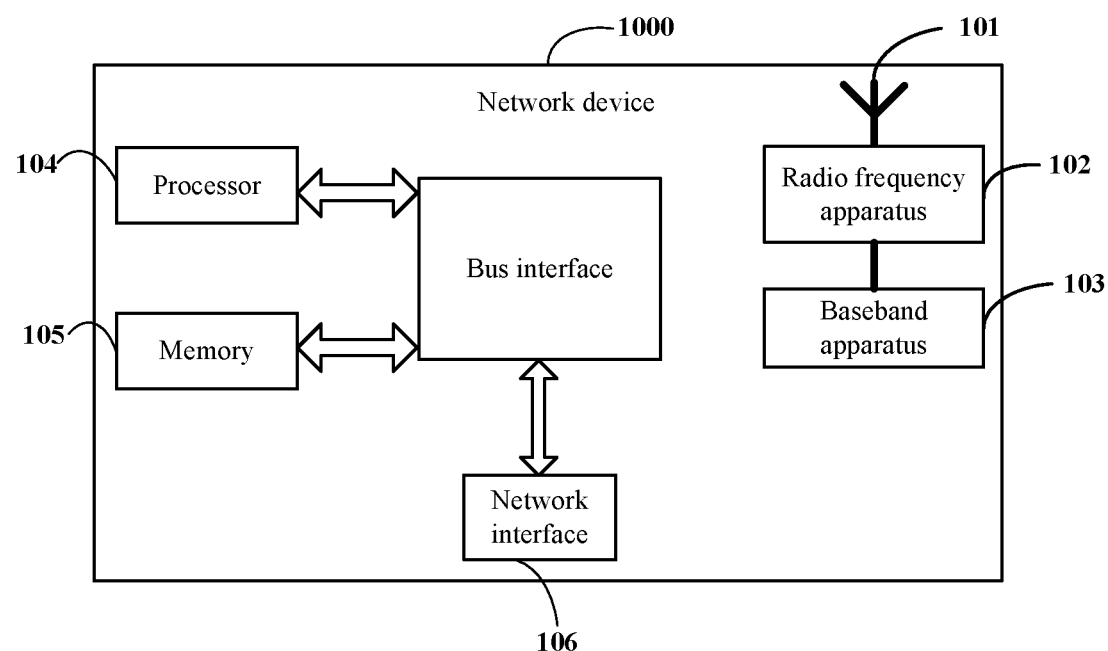
FIG. 10 is a block diagram of a network device according to an embodiment of the present disclosure.

Specifically, an embodiment of the present disclosure further provides a network device. As shown in FIG. 10, a network device 1000 includes: an antenna 101, a radio frequency apparatus 102, and a baseband apparatus 103. The antenna 101 is connected to the radio frequency apparatus 102. In the uplink direction, the radio frequency apparatus 102 receives information through the antenna 101, and sends the received information to the baseband apparatus 103 for processing. In the downlink direction, the baseband apparatus 103 processes information to be sent and sends the information to the radio frequency apparatus 102, and the radio frequency apparatus 102 processes the received information and then sends the information through the antenna 101.

The foregoing band processing apparatus may be located in the baseband apparatus 103, and the method performed by the network device in the foregoing embodiment may be implemented in the baseband apparatus 103. The baseband apparatus 103 includes a processor 104 and a memory 105.

The baseband apparatus 103 may include, for example, at least one baseband board, and multiple chips are arranged on the baseband board. As shown in FIG. 10, one of the chips is, for example, the processor 104, which is connected to the memory 105, to invoke a program in the memory 105, so as to perform the operations of the network device shown in the foregoing method embodiment.

The baseband apparatus 103 may further include a network interface 106, configured to exchange information with the radio frequency apparatus 102. For example, the interface is a Common Public Radio Interface (CPRI).

The processor herein may be a single processor, or may be a collective term for multiple processing elements. For example, the processor may be a CPU or an ASIC, or may be one or more integrated circuits that are configured to implement the foregoing method performed by the network device, for example, may be one or more microprocessors DSPs, or one or more field programmable gate arrays FPGAs. The storage element may be one memory or a collective term for multiple storage elements.

The memory 105 may be a volatile memory or a non-volatile memory, or may include both a volatile memory and a non-volatile memory. The nonvolatile memory may be a ROM, a Programmable ROM (PROM), an Erasable PROM (EPROM), an Electrically EPROM (EEPROM), or a flash memory. The volatile memory may be a RAM, used as an external cache. Through example but not limitative description, many forms of RAMs may be used, for example, a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM), and a Direct Rambus RAM (DRRAM). The memory 105 described in this application is intended to include but not limited to these and any other suitable types of memories.

Specifically, the network device in this embodiment of this disclosure further includes a computer program stored in the memory 105 and executable on the processor 104, and the processor 104 invokes the computer program in the memory 105 to perform the method performed by the modules shown in FIG. 9.

Specifically, the computer program may be invoked by the processor 104 to execute: sending indication information, where the indication information is used to indicate an actual start location for transmission, and the actual start location is a start location of a reference time domain symbol, or the actual start location is within the reference time domain symbol.

The network device in the embodiments of the present disclosure uses the indication information to indicate that the start location of uplink transmission of the terminal can be the start location of a time domain symbol, or can be within a time domain symbol. A start location of transmission is more flexible. This can resolve the problem of granularity matching between information scheduling and unlicensed band transmission, and further ensure normal uplink transmission in an unlicensed band.

A person of ordinary skill in the art may be aware that, in combination with the examples described in the embodiments disclosed in this specification, units and algorithm steps may be implemented by using electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

A person skilled in the art can clearly understand that to describe conveniently and concisely, for a specific working process of the system, apparatus, and unit described above, refer to the corresponding process in the foregoing method embodiments. Details are not described herein again.

In the embodiments provided in this application, it should be understood that the disclosed apparatus and method may be implemented in other manners. For example, the described apparatus embodiment is merely an example. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may be or may not be physically separated, and the components displayed as units may be or may not be physical units, that is, may be located in one place or distributed on multiple network units. Some or all of the units may be selected based on actual requirements to achieve the objectives of the solutions of the embodiments.

In addition, function units in the embodiments of the present disclosure may be integrated into one processing unit, or each of the units may exist alone physically, or two or more units are integrated into one unit.

If the function is implemented in the form of software function units and sold or used as independent products, the function may be stored in a computer-readable storage medium. Based on such an understanding, the technical solutions of the present disclosure essentially, or the part contributing to the related art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present disclosure. The storage medium includes various mediums, such as a USB flash disk, a removable hard disk, a ROM, a RAM, a magnetic disk, or an optical disc, that can store program code.

In addition, it should be noted that in the apparatuses and methods of the present disclosure, it is obvious that the components or the steps may be divided and/or recombined. These division and/or recombination should be considered as equivalent solutions of the present disclosure. Moreover, the steps for performing the foregoing series of processing may be performed naturally in chronological order according to a described sequence, but do not necessarily need to be performed in chronological order, and some steps may be performed in parallel or independently. Those of ordinary skill in the art can understand that all or any steps or components of the method and apparatus in the present disclosure may be implemented by hardware, firmware, software, or a combination thereof in any computing apparatus (including a processor, a storage medium, and the like) or a network of a computing apparatus. This can be implemented as long as those of ordinary skill in the art apply basic programming skill after reading the description of the present disclosure.

Therefore, the objective of the present disclosure may also be achieved by running a program or a set of programs on any computing apparatus. The computing apparatus may be a well-known general-purpose apparatus. Therefore, the objective of the present disclosure may also be achieved only by providing a program product including program code for implementing the method or the apparatus. In other words, such a program product also constitutes the present disclosure, and a storage medium storing such a program product also constitutes the present disclosure. Obviously, the storage medium may be any well-known storage medium or any storage medium to be developed in the future. It should also be noted that in the apparatus and method of the present disclosure, apparently, the components or steps may be divided and/or recombined. These divisions and/or recombinations should be considered as equivalent solutions of the present disclosure. Moreover, the steps for performing the foregoing series of processing may be performed naturally in chronological order according to a described sequence, but do not necessarily need to be performed in chronological order, and some steps may be performed in parallel or independently.

The foregoing descriptions are merely optional implementations of the present disclosure. It should be noted that a person of ordinary skill in the art may make several improvements and polishing without departing from the principle of the present disclosure and the improvements and polishing shall fall within the protection scope of the present disclosure.

The invention claimed is:

1. An information transmission method in an unlicensed band, performed by a terminal, comprising:
    receiving indication information; and
    performing transmission from an actual start location according to the indication information, wherein the actual start location is a start location of a reference time domain symbol, or the actual start location is within the reference time domain symbol, wherein the reference time domain symbol comprises:
    a first time domain symbol of time domain resource assignment, or an $M^{th}$ time domain symbol before a start location of the time domain resource assignment, wherein M is an integer greater than or equal to 1.

2. The information transmission method in an unlicensed band according to claim 1, wherein the indication information comprises:
    a first indicator field used to indicate a channel access type; and
    a second indicator field used to indicate whether the actual start location is the start location of the time domain resource assignment.

3. The information transmission method in an unlicensed band according to claim 2, wherein performing transmission from the actual start location according to the indication information comprises:
    when the second indicator field indicates that the actual start location is not the start location of the time domain resource assignment, if the first indicator field indicates that the channel access type is a first channel access type, performing transmission from an actual start location that offsets by a first offset from the start location of the reference time domain symbol.

4. The information transmission method in an unlicensed band according to claim 2, wherein performing transmission from the actual start location according to the indication information comprises:
    when the second indicator field indicates that the actual start location is not the start location of the time domain resource assignment, if the first indicator field indicates that the channel access type is a second channel access type, performing transmission from an actual start location that offsets by a second offset from the start location of the reference time domain symbol.

5. The information transmission method in an unlicensed band according to claim 2, wherein performing transmission from the actual start location according to the indication information comprises:
    when the second indicator field indicates that the actual start location is the start location of the time domain resource assignment, performing transmission from the start location of the time domain resource assignment.

6. The information transmission method in an unlicensed band according to claim 2, wherein the indication information further comprises:
    a third indicator field used to indicate whether the actual start location offsets by a Timing Advance (TA).

7. The information transmission method in an unlicensed band according to claim 1, wherein the indication information comprises:
    a fourth indicator field used to indicate whether the channel access type is a particular channel access type;
    a fifth indicator field used to indicate whether the actual start location is a start location of time domain resource assignment; and
    a sixth indicator field used to indicate an offset between the actual start location and the start location of the reference time domain symbol.

8. The information transmission method in an unlicensed band according to claim 7, wherein performing transmission from the actual start location according to the indication information comprises:
    when the fourth indicator field indicates that the channel access type is not the particular channel access type and the fifth indicator field indicates that the actual start location is not the start location of the time domain resource assignment, obtaining the actual start location and the channel access type according to the sixth indicator field and performing transmission from the actual start location.

9. The information transmission method in an unlicensed band according to claim 7, wherein performing transmission from the actual start location according to the indication information comprises:
    when the fourth indicator field indicates that the channel access type is not the particular channel access type and the fifth indicator field indicates that the actual start location is the start location of the time domain resource assignment, obtaining the channel access type according to the sixth indicator field and performing transmission from the start location of the time domain resource assignment.

10. The information transmission method in an unlicensed band according to claim 7, wherein performing transmission from the actual start location according to the indication information comprises:

when the fourth indicator field indicates that the channel access type is the particular channel access type, ignoring the fifth indicator field and the sixth indicator field.

11. The information transmission method in an unlicensed band according to claim 1, wherein the reference time domain symbol further comprises:
an $N^{th}$ time domain symbol after the start location of the time domain resource assignment, wherein N is an integer greater than or equal to 1.

12. The information transmission method in an unlicensed band according to claim 1, further comprising:
sending preset information in a time domain resource after the actual start location in the reference time domain symbol, wherein the preset information comprises:
at least one of a reservation signal, data, a reference signal, or an extended cycle prefix.

13. A terminal, comprising a processor; and a memory having a computer program stored thereon, wherein the computer program, when executed by the processor, causes the processor to:
receive indication information; and
perform transmission from an actual start location according to the indication information, wherein the actual start location is a start location of a reference time domain symbol, or the actual start location is within the reference time domain symbol, wherein the reference time domain symbol comprises:
a first time domain symbol of time domain resource assignment, or an $M^{th}$ time domain symbol before a start location of the time domain resource assignment, wherein M is an integer greater than or equal to 1.

14. The terminal according to claim 13, wherein the indication information comprises:
a first indicator field used to indicate a channel access type; and
a second indicator field used to indicate whether the actual start location is the start location of the time domain resource assignment.

15. The terminal according to claim 14, wherein to perform transmission from the actual start location according to the indication information, the processor is further configured to: when the second indicator field indicates that the actual start location is not the start location of the time domain resource assignment, if the first indicator field indicates that the channel access type is a first channel access type, perform transmission from an actual start location that offsets by a first offset from the start location of the reference time domain symbol.

16. The terminal according to claim 14, wherein to perform transmission from the actual start location according to the indication information, the processor is further configured to: when the second indicator field indicates that the actual start location is not the start location of the time domain resource assignment, if the first indicator field indicates that the channel access type is a second channel access type, perform transmission from an actual start location that offsets by a second offset from the start location of the reference time domain symbol.

17. The terminal according to claim 14, wherein the processor is further configured to: when the second indicator field indicates that the actual start location is the start location of the time domain resource assignment, perform transmission from the start location of the time domain resource assignment.

18. The terminal according to claim 14, wherein the indication information further comprises:
a third indicator field used to indicate whether the actual start location offsets by a Timing Advance (TA).

19. The terminal according to claim 13, wherein the reference time domain symbol further comprises: an $N^{th}$ time domain symbol after the start location of the time domain resource assignment, wherein N is an integer greater than or equal to 1.

20. A non-transitory computer-readable storage medium, wherein the non-transitory computer-readable storage medium stores a computer program, and when the computer program is executed by a processor, causes the processor to:
receive indication information; and
perform transmission from an actual start location according to the indication information, wherein the actual start location is a start location of a reference time domain symbol, or the actual start location is within the reference time domain symbol, wherein the reference time domain symbol comprises:
a first time domain symbol of time domain resource assignment, or an $M^{th}$ time domain symbol before a start location of the time domain resource assignment, wherein M is an integer greater than or equal to 1.

* * * * *